US008917716B2

(12) United States Patent
Tran

(10) Patent No.: US 8,917,716 B2
(45) Date of Patent: Dec. 23, 2014

(54) MESH NETWORK TELEPHONE SYSTEM

(75) Inventor: Bao Q. Tran, San Jose, CA (US)

(73) Assignee: Muse Green Investments LLC, Dover, DE (US)

( * ) Notice: Subject to any disclaimer, the term of this patent is extended or adjusted under 35 U.S.C. 154(b) by 2123 days.

(21) Appl. No.: 11/405,326

(22) Filed: Apr. 17, 2006

(65) Prior Publication Data

US 2007/0242661 A1 Oct. 18, 2007

(51) Int. Cl.
*H04L 12/66* (2006.01)
*H04M 7/12* (2006.01)
*H04L 29/12* (2006.01)
*H04M 3/42* (2006.01)
*H04M 11/00* (2006.01)
*H04M 3/493* (2006.01)
*H04W 84/10* (2009.01)

(52) U.S. Cl.
CPC .......... *H04M 7/121* (2013.01); *H04L 29/1216* (2013.01); *H04L 61/157* (2013.01); *H04M 3/42348* (2013.01); *H04M 11/00* (2013.01); *H04M 3/493* (2013.01); *H04W 84/10* (2013.01)
USPC .......... 370/352; 370/356; 370/353; 370/401; 370/406; 370/354; 455/414.1

(58) Field of Classification Search
CPC ... H04L 29/1216; H04L 61/157; H04L 7/121; H04L 65/1036; H04L 12/2834; H04L 12/2836; H04L 12/2838; H04M 11/00; H04M 3/42348; H04M 3/493; H04M 7/121
USPC ................ 370/352–356, 401, 406; 455/414.1
See application file for complete search history.

(56) References Cited

U.S. PATENT DOCUMENTS

| 5,605,336 | A | 2/1997 | Gaoiran |
| 6,125,277 | A | 9/2000 | Tanaka |
| 6,829,243 | B1 | 12/2004 | Sundhar |
| 6,832,251 | B1 | 12/2004 | Gelvin |
| 6,908,388 | B2 | 6/2005 | Shimizu |
| 6,980,984 | B1 | 12/2005 | Huffman |
| 7,933,388 | B1 * | 4/2011 | Vanier et al. .................. 379/67.1 |
| 2002/0159409 | A1 * | 10/2002 | Wolfe et al. ................... 370/329 |
| 2002/0183008 | A1 * | 12/2002 | Menard et al. ................. 455/66 |
| 2004/0025072 | A1 * | 2/2004 | Mau .............................. 713/400 |
| 2004/0234064 | A1 * | 11/2004 | Melideo ................... 379/265.09 |
| 2005/0068938 | A1 * | 3/2005 | Wang et al. .................. 370/352 |
| 2005/0175161 | A1 * | 8/2005 | Reynolds et al. .......... 379/88.17 |
| 2005/0240086 | A1 * | 10/2005 | Akay ............................ 600/300 |
| 2005/0245240 | A1 * | 11/2005 | Balasuriya et al. ........ 455/414.1 |

(Continued)

OTHER PUBLICATIONS

ZigBee Web Page, <http://zigbee.org/en/index.asp> [retrieved Jun. 12, 2006], 2 pages.

(Continued)

*Primary Examiner* — Khaled Kassim
(74) *Attorney, Agent, or Firm* — Christensen O'Connor Johnson Kindness PLLC

(57) ABSTRACT

Systems and methods are disclosed having one or more mesh network appliances (such as ZigBee appliances); a mesh network telephone base station in communication with the mesh network appliances, the mesh network telephone base station including a telephone jack wired to a plain old telephone service (POTS) or a public switched telephone network (PSTN) land-line; and a telephone in communication with the one or more mesh network appliances including the mesh network telephone base station.

28 Claims, 7 Drawing Sheets

(56) References Cited

U.S. PATENT DOCUMENTS

| | | |
|---|---|---|
| 2005/0266831 A1 | 12/2005 | Roth |
| 2005/0266863 A1 | 12/2005 | Benco |
| 2006/0025891 A1* | 2/2006 | Budike, Jr. .................... 700/275 |
| 2006/0030290 A1* | 2/2006 | Rudolf et al. .............. 455/404.1 |
| 2006/0077968 A1 | 4/2006 | Pitsoulakis |
| 2006/0154642 A1* | 7/2006 | Scannell, Jr. ............... 455/404.1 |
| 2006/0182076 A1* | 8/2006 | Wang ............................ 370/338 |
| 2006/0232611 A1 | 10/2006 | Brooke |
| 2007/0076697 A1* | 4/2007 | Huotari et al. ................ 370/352 |
| 2007/0081662 A1* | 4/2007 | Altberg et al. ........... 379/355.03 |
| 2007/0143479 A1 | 6/2007 | Putnam |
| 2007/0192168 A1* | 8/2007 | Van Luchene .................. 705/10 |
| 2007/0242626 A1* | 10/2007 | Altberg et al. ................ 370/259 |
| 2008/0001734 A1* | 1/2008 | Stilp et al. ................ 340/539.22 |
| 2008/0300046 A1 | 12/2008 | Gagner |

OTHER PUBLICATIONS

Logix Mobile Frequently Asked Questions Web Page dated Feb. 11, 2006.

UPSNAP Frequently Asked Questions Web Page dated Feb. 10, 2006.

* cited by examiner

MESH NETWORK TELEPHONE SYSTEM

BACKGROUND

Internet protocol (IP) telephones are typically personal computer (PC) based telephones connected within an IP network, such as the public internet or a private network of a large organization. These IP telephones have installed "voice-over-IP" (VoIP) software enabling them to make and receive voice calls as well as send and receive information in data and video formats. IP telephony switches installed within the IP network enable voice calls to be made within or between IP networks, and between an IP network and a switched circuit network (SCN), such as the public switched telephone network (PSTN). If the IP switch supports the Signaling System 7 (SS7) protocol, the IP telephone can also access PSTN data bases.

Subscribers to the PSTN have access to certain fee-based telephone services provided by the local telephone switching company. These include directory assistance ("DA"), which allow a caller to request operator assistance in obtaining a directory number ("DN"). Rather than dialing "0" to access the local operator, the caller dials either: 411, 1-555-1212, or 1-NPA-555-1212 (where NPA is the Numbering Plan Area, or area code) and the call is presented to an operator on a screen that immediately identifies the call as a DA call. The operator obtains the DA search query information from the subscriber and initiates a DA database search. The DA database returns all listings that match the search criteria. The operator then selects the appropriate listing and releases the call to an audio response unit (ARU) that provides the subscriber with an audible report of the requested number.

The DA service is provided at a fee by the service provider and is an important revenue source. Similarly, the service is valuable to the subscriber when time or circumstance prevent the caller from determining the requested number on their own. Despite the benefits to both service provider and subscriber, the DA service does have limitations for both parties. For the subscriber the reported telephone number is provided as an audible response. Although the reported number is repeated to give the caller the opportunity to either memorize or record it, the information is generally "jotted down" in a temporary way; sufficient only to make the present call. The failure to record the information in a permanent way, such as in a subscriber's telephone personal directory, typically results in the need to again access the DA service the next time the call must be made.

Since the DA service is a revenue source for the service provider the repeat access by a subscriber may well be considered a positive result. However, there are efficiencies with providing the DA service which are important to profitability. Since the subscriber calling the DA service operator does not necessarily have detailed information as to the residence, or even the locale of the party at the requested number, there is dialogue that must occur with the subscriber to allow the DA operator to narrow the search command to the DA database. For providers of telephone services in large metropolitan areas, this dialogue time can be significant, resulting in a corresponding amount of operator time to complete the transaction. As such, some service providers have begun use of automated operator technology in which a subscriber accesses a computer generated voice response menu and enters information via the telephone keypad. While this becomes a greater burden to the subscriber, it reduces the service provider's real-time cost of providing real-time operators.

U.S. Pat. No. 6,829,243 discloses that DA information is provided by a telephone system to internet protocol client telephones in selectable formats including: a text data format provided jointly with an aural format in response to an aural request from the client and, alternately, in text data format in response to a text message request from the client.

U.S. Pat. No. 6,125,277 shows a cordless telephone which can be connected to any one of digital exchanges of different protocols. A main unit of the cordless telephone is provided with a memory for storing a table for collating control data (first control data) defined by the protocol of a digital exchange to be connected and control data (second control data) inherent to the cordless telephone. The main unit also includes a protocol converting circuit 4 for conversion between the first control data and the second control data. If the cordless telephone is to be connected to another digital exchange structured in a different protocol, a protocol circuit 4 corresponding to the protocol of the digital exchange is used. Transfer of conversation between the cordless telephone and a fixed telephone can also be realized by providing a data distributing and combining circuit.

U.S. Patent Application No. 20060077968 shows several examples for in-home Voice-Over-Internet Protocol (VoIP) telephony distribution. In one example, an analog telephone adapter may be modified to provide wireless capabilities. In another example, an isolation device or circuit may be added to a Network Interface Device or a Central Office. In yet another example, a second pair of wires may be used to provide VoIP service. As a result of implementing any one of these examples, a user may place a VoIP call throughout the user's home without being tethered to a fixed location.

SUMMARY

In one aspect, a system includes a mesh network; a mesh network telephone base station in communication with the mesh network, the mesh network telephone base station including a telephone jack wired to a plain old telephone service (POTS) or a public switched telephone network (PSTN) land-line; and a telephone in communication with the telephone base station over the mesh network.

Implementations of the above system may include one or more of the following. The mesh network can be an 805.15 network, a ZigBee network or a compatible 2.4 GHz network. The telephone records a message from a caller, wherein the telephone answers two calls by selecting a first line or a second line and wherein the telephone receives distinctive ring tones and rings with a melody or distinctive ring pattern. The telephone can be a Voice Over Internet Protocol (VOIP) telephone. A remote server can communicate with the mesh network through the Plain Old Telephone System (POTS) or the Public Switched Telephone Network (PSTN), the server receiving a search query from the telephone; the server searching one or more databases based on the search query and returning a search result on the display. A third party associated with one of the search results is selected to call back the telephone. The server can transmit the telephone's caller identification (Caller ID) number to the entity for calling back the telephone and wherein the third party pays a fee for each Caller ID. The databases can be a regular database or a federated database providing taxonomy of: music, food, restaurant, movie, map, telephone directory, news, blogs, weather, stocks, calendar, sports, horoscopes, lottery, messages, traffic, or direction. The system includes one or more mesh network appliances to provide home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnostics. The telephone can be connected to a cellular telephone to answer calls directed at the cellular telephone. The connection can be wired or wireless using Bluetooth or ZigBee. The telephone synchronizes calendar, contact, emails, blogs, or instant messaging with the cellular telephone. Similarly, the telephone synchronizes calendar, contact, emails, blogs, or instant messaging with a personal computer. The system can include a patient monitoring appliance coupled to the POTS or PSTN through the mesh network. The patient monitoring appliance monitors drug usage and patient falls. The patient monitoring appliance monitors patient movement. An indoor positioning system links one or more mesh network appliances to provide location information. A call center can call to the telephone to provide a human response. A web server can communicate with the Internet through the POTS to provide information to an authorized remote user who logs into the server. A wireless router such as an 802.11 router, 802.16 router, WiFi router, WiMAX router, Bluetooth router, or X10 router can be connected to the mesh network. A mesh network appliance can be connected to a power line to communicate X10 data to and from the mesh network.

In another aspect, a system includes a cordless telephone having a ZigBee transceiver to communicate digitized voice and data over a ZigBee wireless link; and a base station wirelessly coupled to the cordless telephone over the ZigBee wireless link, the base station having a telephone jack coupled to a plain old telephone service (POTS) or a public switched telephone network (PSTN) land-line.

In implementations of the ZigBee cordless phone, a server located on the POTS or PSTN office can receive a search query from the telephone; the server searching one or more databases based on the search query and returning a search result to display on the telephone, wherein the server provides information to one of: directory assistance, yellow page directory, white page directory, search engine, music, food, restaurant, movie, map, telephone directory, news, blogs, weather, stocks, calendar, sports, horoscopes, lottery, messages, traffic, direction, wherein the server transmits the telephone's caller identification (Caller ID) number to a third party to call back the telephone and wherein the third party pays a fee for each Caller ID.

In another aspect, a method to operate a telephone includes receiving a search query from the telephone; transmitting the search query to a search engine; searching one or more taxonomic databases based on the search query; and returning a search result to display on the telephone.

In another aspect, a system includes a telephone coupled to a wide area network; and a server coupled to the telephone over the wide area network, the server receiving a search query from the telephone; the server searching one or more taxonomic databases based on the search query and returning a search result to the telephone.

In yet another aspect, a system includes a handheld telephone coupled to a plain old telephone service (POTS) or a public switched telephone network (PSTN), the handheld telephone having a modem; a server coupled to the telephone over the POTS or PSTN, the server receiving a search query from the telephone; the server searching one or more databases based on the search query and returning a search result to display on the telephone.

In a further aspect, a telephone system for making free VOIP calls includes a handset with a display, a keypad, and a modem communicating with a remote server. The user makes local and long distance calls for free and in addition may have access to value added services that include, but are not limited to, music, food, restaurant, movie, map, telephone directory, news, blogs, weather, stocks, calendar, sports, horoscopes, lottery, messages, or traffic databases. The display of the phone periodically shows information of interest to the user (such as ads), based on a profile that the user makes when registering with the system. The profile is updated to track services and products that the user actually uses.

Implementations of the above may include one or more of the following. The system can capture a verbal search request and transmit the verbal search request to the search engine. The verbal search request comprises one of: phoneme, diphone, triphone, syllable, demisyllable, cepstral coefficient, cepstrum coefficient. The search user can designate an entity from one of the search results to call back the telephone. One way to select is to click on a link and click on a subsequent button to confirm that the company associated with the link should call the user's telephone and the system can transmit the telephone's caller identification (Caller ID) number to the entity for calling back the telephone. The entity pays a fee for each Caller ID as a referral fee, advertising fee, membership fee, or any other suitable business model fees. The telephone can be a Voice Over Internet Protocol (VOIP) telephone, a cellular telephone, a WiFi telephone, a WiMAX telephone. The phone can provide directions to one of: a store, a retailer, a company, a venue. The taxonomic databases can be music, food, restaurant, movie, map, telephone directory, news, blogs, weather, stocks, calendar, sports, horoscopes, lottery, messages, or traffic databases. The system can perform automated position determination with one of: triangulation based location determination, WiFi location determination, GPS, assisted GPS, GLONASS, assisted GLONASS, GALILEO, or assisted GALILEO.

In yet another aspect, systems and methods are disclosed to operate a mobile device. The system includes a message center; an engine coupled to the message center; and a mobile device wirelessly coupled to the message center, wherein the engine specifies one or more meeting locations and wherein at least one meeting location comprises a location designated by an advertiser.

In another aspect, systems and methods are disclosed to operate a mobile device by capturing user speech; converting the user speech into one or more speech symbols; transmitting the speech symbols over a wireless messaging channel to an engine (such as a search engine or a game engine, among others); and generating a result based on the speech symbols.

In yet another aspect, a system operates a mobile device with a message center; an engine (such as a search engine or a game engine, for example) coupled to the message center; and a mobile device wirelessly coupled to the message center, the mobile device capturing user speech, converting the user speech into one or more speech symbols; transmitting the speech symbols over a wireless messaging channel to the engine; and receiving a search result from the engine based on the speech symbols.

Implementations of the above aspects may include one or more of the following. The disambiguating symbol can be a location. The system can improve recognition accuracy based on the location information. The system can refine the result based on user history. The system can analyze usage pattern from a population of users to refine the result. The result can be ranked based on payment by an entity that is the target of the search. The system can search for one of: services, people, products, and companies. The system can enhance a search for one of: services, people, products, and companies by tailoring the search with one of: telephone area code, zip code, airport code. The system can also enhance a search for one of: services, people, products, and companies by tailoring the search with automated position determination. The automated position determination can include triangulation based location determination, WiFi location determination, GPS, assisted GPS, GLONASS, assisted GLONASS, GALILEO, or assisted GALILEO.

In another aspect, one of the appliances can be a mesh network router that includes a modem coupled to a wide area network, one or more 802.11 (WiFi) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

In another aspect, a mesh network router includes a modem coupled to a wide area network, one or more 802.16 (WiMax) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

Advantages of the system may include one or more of the following. The system is inexpensive to manufacture and provides a full-featured home/office wireless network that can handle voice as well as data and provides search capability for cordless phones.

DESCRIPTION

Figure 1:
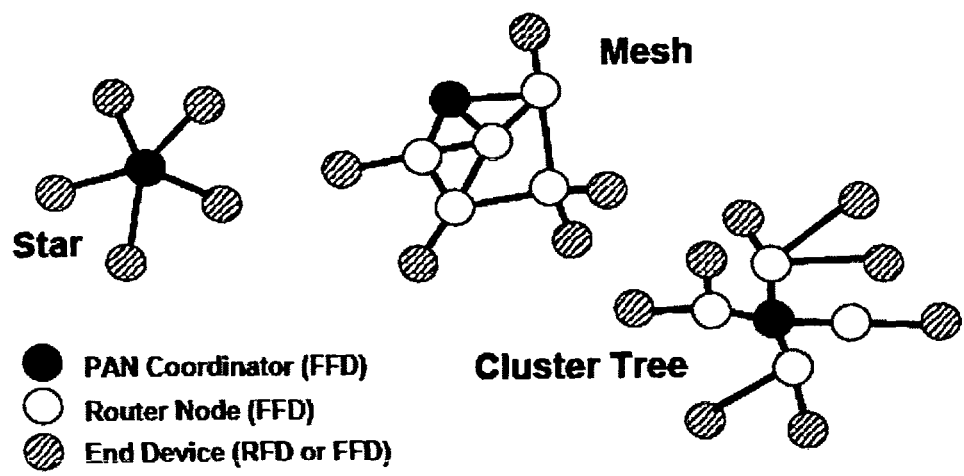
FIG. 1 shows a typical organization of a mesh network that includes a telephone node.

FIG. 1A shows a representative mesh network that includes a mesh network telephone such as a wired telephone as well as a cordless telephone. In one embodiment, the mesh network is an IEEE 802.15.4 (ZigBee) network. IEEE 802.15.4 defines two device types: the reduced function device (RFD) and the full function device (FFD). In ZigBee these are referred to as the ZigBee Physical Device types. In a ZigBee network a node can have three roles: ZigBee Coordinator, ZigBee Router, and ZigBee End Device. These are the ZigBee Logical Device types. The main responsibility of a ZigBee Coordinator is to establish a network and to define its main parameters (e.g., choosing a radio-frequency channel and defining a unique network identifier). One can extend the communication range of a network by using ZigBee Routers. These can act as relays between devices that are too far apart to communicate directly. ZigBee End Devices do not participate in routing. An FFD can talk to RFDs or other FFDs, while an RFD can talk only to an FFD. An RFD is intended for applications that are extremely simple, such as a light switch or a passive infrared sensor; they do not have the need to send large amounts of data and may only associate with a single FFD at a time. Consequently, the RFD can be implemented using minimal resources and memory capacity and have lower cost than an FFD. An FFD can be used to implement all three ZigBee Logical Device types, while an RFD can take the role as an End Device.

One embodiment supports a multicluster-multihop network assembly to enable communication among every node in a distribution of nodes. The algorithm should ensure total connectivity, given a network distribution that will allow total connectivity. One such algorithm of an embodiment is described in U.S. Pat. No. 6,832,251, the content of which is hereby incorporated by reference. The '251 algorithm runs on each node independently. Consequently, the algorithm does not have global knowledge of network topology, only local knowledge of its immediate neighborhood. This makes it well suited to a wide variety of applications in which the topology may be time-varying, and the number of nodes may be unknown. Initially, all nodes consider themselves remotes on cluster zero. The assembly algorithm floods one packet (called an assembly packet) throughout the network. As the packet is flooded, each node modifies it slightly to indicate what the next node should do. The assembly packet tells a node whether it is a base or a remote, and to what cluster it belongs. If a node has seen an assembly packet before, it will ignore all further assembly packets.

The algorithm starts by selecting (manually or automatically) a start node. For example, this could be the first node to wake up. This start node becomes a base on cluster 1, and floods an assembly packet to all of its neighbors, telling them to be remotes on cluster 1. These remotes in turn tell all their neighbors to be bases on cluster 2. Only nodes that have not seen an assembly packet before will respond to this request, so nodes that already have decided what to be will not change their status. The packet continues on, oscillating back and forth between "become base/become remote", and increasing the cluster number each time. Since the packet is flooded to all neighbors at every step, it will reach every node in the network. Because of the oscillating nature of the "become base/become remote" instructions, no two bases will be adjacent. The basic algorithm establishes a multi-cluster network with all gateways between clusters, but self-assembly time is proportional with the size of the network. Further, it includes only single hop clusters. Many generalizations are possible, however. If many nodes can begin the network nucleation, all that is required to harmonize the clusters is a mechanism that recognizes precedence (e.g., time of nucleation, size of subnetwork), so that conflicts in boundary clusters are resolved. Multiple-hop clusters can be enabled by means of establishing new clusters from nodes that are N hops distant from the master.

Having established a network in this fashion, the masters can be optimized either based on number of neighbors, or other criteria such as minimum energy per neighbor communication. Thus, the basic algorithm is at the heart of a number of variations that lead to a scalable multi-cluster network that establishes itself in time, and that is nearly independent of the number of nodes, with clusters arranged according to any of a wide range of optimality criteria. Network synchronism is established at the same time as the network connections, since the assembly packet(s) convey timing information outwards from connected nodes.

The network nodes can be mesh network appliances to provide voice communications, home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnostics. The telephone can be connected to a cellular telephone to answer calls directed at the cellular telephone. The connection can be wired or wireless using Bluetooth or ZigBee. The telephone synchronizes calendar, contact, emails, blogs, or instant messaging with the cellular telephone. Similarly, the telephone synchronizes calendar, contact, emails, blogs, or instant messaging with a personal computer. A web server can communicate with the Internet through the POTS to provide information to an authorized remote user who logs into the server. A wireless router such as 802.11 router, 802.16 router, WiFi router, WiMAX router, Bluetooth router, or X10 router can be connected to the mesh network.

A mesh network appliance can be connected to a power line to communicate X10 data to and from the mesh network. X10 is a communication protocol that allows up to 256 X10 products to talk to each other using the existing electrical wiring in the home. Typically, the installation is simple, transmitter plugs (or wires) are wired at one location in the home and sends its control signal (on, off, dim, bright, etc.) to a receiver which plugs (or wires) into another location in the home. The mesh network appliance translates messages intended for an X10 device to be relayed over the ZigBee wireless network, and then transmitted over the power line using a ZigBee to X10 converter appliance.

An indoor positioning system links one or more mesh network appliances to provide location information. Inside the home or office, the radio frequency signals have negligible multipath delay spread (for timing purposes) over short distances. Hence, radio strength can be used as a basis for determining position. Alternatively, time of arrival can be used to determine position, or a combination of radio signal strength and time of arrival can be used. Position estimates can also be achieved in an embodiment by beamforming, a method that exchanges time-stamped raw data among the nodes. While the processing is relatively more costly, it yields processed data with a higher signal to noise ratio (SNR) for subsequent classification decisions, and enables estimates of angles of arrival for targets that are outside the convex hull of the participating sensors. Two such clusters of ZigBee nodes can then provide for triangulation of distant targets. Further, beamforming enables suppression of interfering sources, by placing nulls in the synthetic beam pattern in their directions. Another use of beamforming is in self-location of nodes when the positions of a very small number of nodes or appliances are known such as those sensors nearest the wireless stations. In one implementation where each node knows the distances to its neighbors due to their positions, and some small fraction of the nodes (such as those nearest a PC with GPS) of the network know their true locations. As part of the network-building procedure, estimates of the locations of the nodes that lie within or near the convex hull of the nodes with known positions can be quickly generated. To start, the shortest distance (multihop) paths are determined between each reference node. All nodes on this path are assigned a location that is the simple linear average of the two reference locations, as if the path were a straight line. A node which lies on the intersection of two such paths is assigned the average of the two indicated locations. All nodes that have been assigned locations now serve as references. The shortest paths among these new reference nodes are computed, assigning locations to all intermediate nodes as before, and continuing these iterations until no further nodes get assigned locations. This will not assign initial position estimates to all sensors. The remainder can be assigned locations based on pairwise averages of distances to the nearest four original reference nodes. Some consistency checks on location can be made using trigonometry and one further reference node to determine whether or not the node likely lies within the convex hull of the original four reference sensors.

In two dimensions, if two nodes have known locations, and the distances to a third node are known from the two nodes, then trigonometry can be used to precisely determine the location of the third node. Distances from another node can resolve any ambiguity. Similarly, simple geometry produces precise calculations in three dimensions given four reference nodes. But since the references may also have uncertainty, an alternative procedure is to perform a series of iterations where successive trigonometric calculations result only in a delta of movement in the position of the node. This process can determine locations of nodes outside the convex hull of the reference sensors. It is also amenable to averaging over the positions of all neighbors, since there will often be more neighbors than are strictly required to determine location. This will reduce the effects of distance measurement errors. Alternatively, the network can solve the complete set of equations of intersections of hyperbola as a least squares optimization problem.

In yet another embodiment, any or all of the nodes may include transducers for acoustic, infrared (IR), and radio frequency (RF) ranging. Therefore, the nodes have heterogeneous capabilities for ranging. The heterogeneous capabilities further include different margins of ranging error. Furthermore, the ranging system is re-used for sensing and communication functions. For example, wideband acoustic functionality is available for use in communicating, bistatic sensing, and ranging. Such heterogeneous capability of the sensors 40 can provide for ranging functionality in addition to communications functions. As one example, repeated use of the communications function improves position determination accuracy over time. Also, when the ranging and the timing are conducted together, they can be integrated in a self-organization protocol in order to reduce energy consumption. Moreover, information from several ranging sources is capable of being fused to provide improved accuracy and resistance to environmental variability. Each ranging means is exploited as a communication means, thereby providing improved robustness in the presence of noise and interference. There are many architectural possibilities, but allowing for heterogeneity from the outset is a component in many of the architectures.

The term "positional measurement," as that term is used herein, is not limited to longitude and latitude measurements, or to metes and bounds, but includes information in any form from which geophysical positions can be derived. These include, but are not limited to, the distance and direction from a known benchmark, measurements of the time required for certain signals to travel from a known source to the geophysical location where the signals may be electromagnetic or other forms, or measured in terms of phase, range, Doppler or other units.

The system can include a patient monitoring appliance coupled to the POTS or PSTN through the mesh network. The patient monitoring appliance monitors drug usage and patient falls. The patient monitoring appliance monitors patient movement. A call center can call to the telephone to provide a human response.

Figure 2:
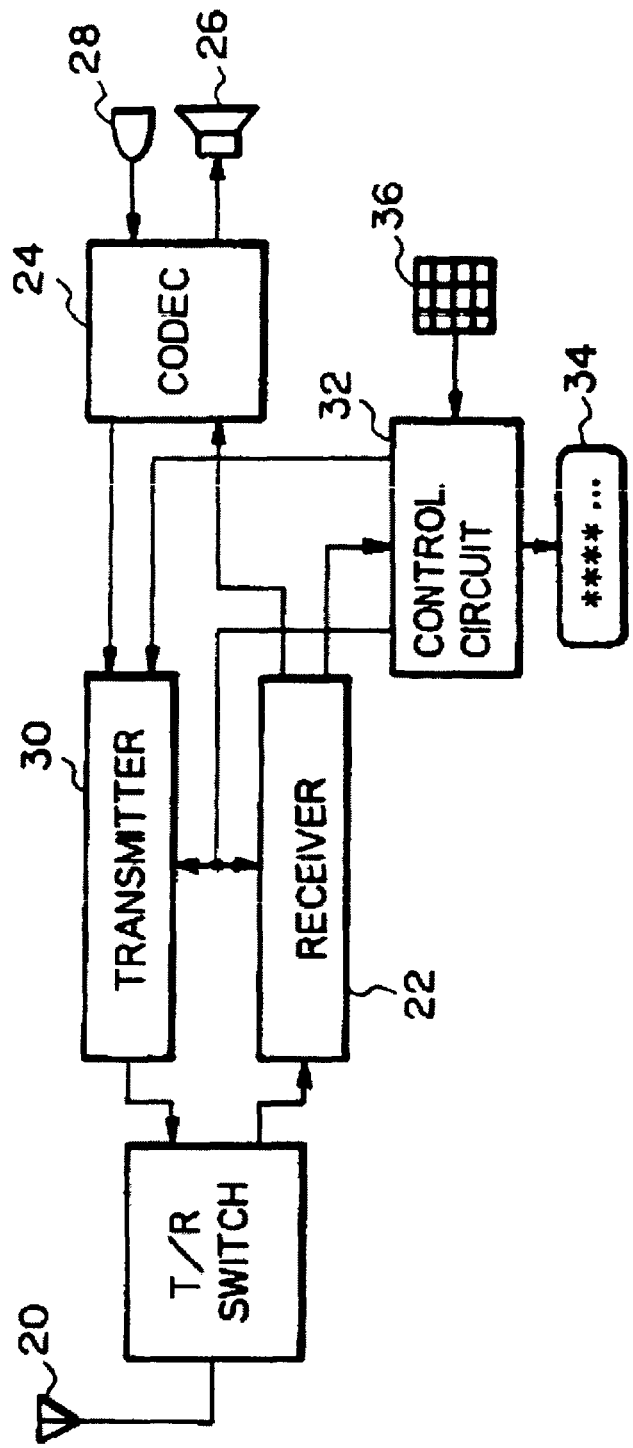
FIG. 2 shows a representative mesh network telephone.

FIG. 2 shows a representative mesh network node which acts as a cordless telephone. In FIG. 2, an antenna 20 is provided for transmitting and receiving control data and voice data to/from a base station; a receiver 22 for receiving a signal from the antenna 20 and demodulating it to separately extract encoded control data and voice data; a codec 24 for decoding the voice data from the receiver 22 to reproduce a received signal from a loud speaker 26 and for encoding a sound applied to a microphone 28 to send an encoded sound signal to a transmitter 30 for modulating the encoded sound signal to transmit the signal from the antenna 20; and a control circuit 32 for controlling operations of the receiver 22 and the transmitter 30, controlling transmission and reception of a call by receiving the control data from the receiver 22, causing a display device 34 to display received display data, and supplying control data inputted from a key pad 36 to the transmitter 30 and displaying the control data on the display device 34.

In one implementation, the receiver 22, codec 24, transmitter 30, and control circuit 32 can be a single chip ZigBee system on a chip (SOC) that contains an IEEE 802.15.4 radio-transceiver, a microcontroller, program/data memory (flash and RAM), and necessary peripherals. The SOC greatly reduces power consumption and cost while improving the performance of the mesh network telephone over conventional corded telephone hand-sets.

The mesh network telephone communicates wirelessly with a mesh network node acting as a telephone base station in communication with the mesh network. The mesh network telephone base station includes a telephone jack wired to a plain old telephone service (POTS) or a public switched telephone network (PSTN) land-line. When a call comes in, the base station digitizes the audio and compresses the digitized audio data for transmission over the ZigBee wireless mesh network to the cordless telephone of FIG. 2. A full duplex link is established between the base station and the telephone so that transmission of voice and/or data occurs in two directions simultaneously. For example, the telephone is a full-duplex device because both parties can talk at once.

In one embodiment, instead of being connected to the POTS or PSTN, the corded phone is connected to a PBX. In the case where data is transmitted to the digital PBX from the cordless telephone, control data and voice data (these data are encoded by the code) transmitted from the telephone are modulated by the transmitter 30 and then transmitted as an electric wave from the antenna 20. The electric wave is then received by the antenna on the base station and is then supplied to a base station receiver. The base station receiver decodes the received control data and voice data and separately extracts the control data and the voice data. The extracted control data are sent as inherent control data to the protocol converting circuit. The cordless telephone can be connected to various digital PBXs of different protocols by providing, for each digital PBX of every different protocol, a protocol converting circuit which incorporates a ROM storing a table for the collation between control data defined by the protocol of the digital PBX to which the cordless telephone is to be connected and control data inherent to the cordless telephone as well as a data transmitting and receiving circuit which has a configuration corresponding to the number of digital PBX lines and transmits and receives control data and voice data, the protocol converting circuit and the data transmitting and receiving circuit being selected in correspondence with the digital PBX to be connected.

The telephone provides common functionality such as speaker phone capability, voice recording capability to capture a message from a caller, multi-line capability where the telephone answers two calls by selecting a first line or a second line, or distinctive ring tones and rings with a melody or distinctive ring pattern. The telephone can be a Voice Over Internet Protocol (VoIP) telephone.

A remote server can communicate with the mesh network through the wired Plain Old Telephone Service (POTS) system or the Public Switched Telephone Network (PSTN) system. The server receives a search query from the telephone; searches one or more databases based on the search query and returns a search result on the display of the telephone. A third party associated with one of the search results is selected to call back the telephone. The server can transmit the telephone's caller identification (Caller ID) number to the entity for calling back the telephone and wherein the third party pays a fee for each Caller ID. The databases can be a regular database or a federated database providing taxonomy of: music, food, restaurant, movie, map, telephone directory, news, blogs, weather, stocks, calendar, sports, horoscopes, lottery, messages, traffic, or direction. The databases can also be an internal corporate database or intranet that can be searched by a search engine and rendered through the PBX system.

Figure 3:
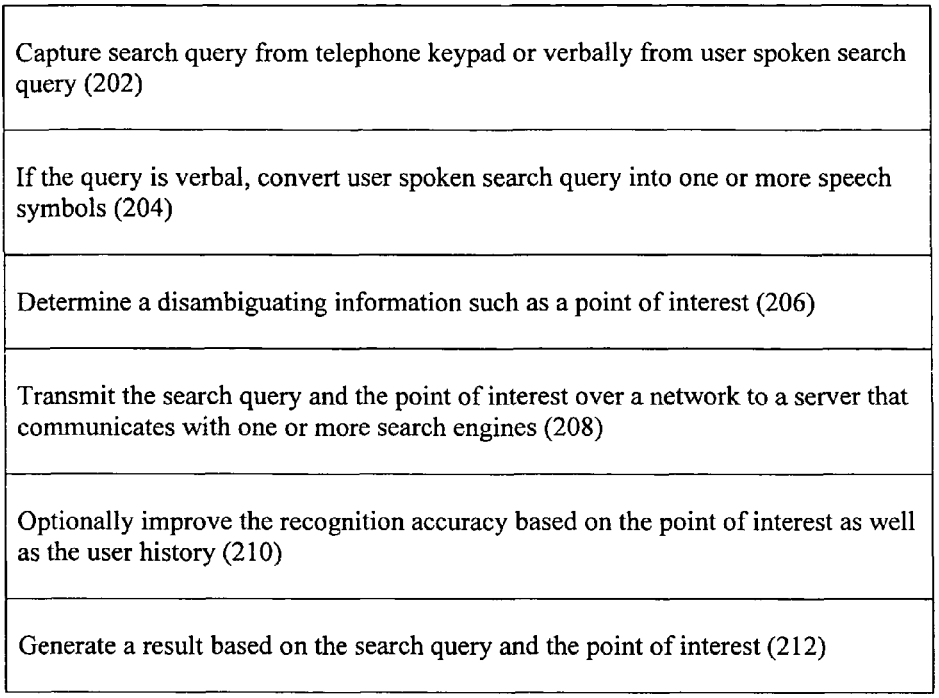
FIG. 3 shows a representative process for using the telephone to submit a search query to a remote server.

FIG. 3 shows a representative process for sending a search query from the telephone of FIG. 2 to a remote server for searching information. The process captures a search query specified through the telephone keypad or user speech in step 202. If the user opts to use a voice search, the telephone converts user speech into one or more speech symbols in step 204. The speech symbols can be phonemes, diphones, triphones, syllables, and demisyllables. The symbols can be LPC cepstral coefficients or MEL cepstrum coding technique can be used as symbols as well. More details on the conversion of user speech into symbols are disclosed in U.S. Pat. No. 6,070, 140 entitled "Speech Recognizer" by the inventor of the instant application, the content of which is hereby incorporated by reference.

Next, the process determines a point of interest such as an XY coordinate, a city name, a zip code, or an address in step 206. The process transmits the typed search query or the speech symbols representing the verbal search and the point of interest over a network to a search engine in step 208. The search engine can perform the search and, where the search query is verbal, the server can optionally improve the recognition accuracy based on the point of interest as well as the user history in step 210. For example, if the user pronounces "Starbucks 95135" to try to locate a Starbucks coffee shop in the area with zip code 95135, the system, based on prior user requests, would initiate a search query for Starbucks in the area with zip code 95135. The system generates a search result based on the speech symbols and the point of interest in step 212. The user can scroll the search results and identify the entity that he/she would like to contact. Alternatively, the user can press a button to indicate that the entity should call back the user.

In one embodiment, merchants pay the operator of the system for the privilege of calling the user back. Consumers simply elect to be called back by a merchant, by selecting the merchant. The server then bridges the mobile phone with the merchant automatically. The service is useful when traveling or when the user is unable to write down a number. Merchants pay to have their listings first. The user still gets listings for all merchants in the category he or she selects.

In addition to free text search, the system can also search predefined categories as well as undefined categories. For examples, the predefined categories can be sports, stocks, flight status, package tracking, price comparison, weather, yellow pages, movie show times, wifi hotspots, news, hotel reservations, drink recipes, jokes, horoscopes, or pickup lines, for example.

In yet other embodiments, the voice search system can provide mobile access to virtually any type of live and on-demand audio content, including Internet-based streaming audio, radio, television or other audio source. Wireless users can listen to their favorite music, catch up on the latest news, or follow their favorite sports.

The system can also automatically send information to the mobile device via text messages. An alert can be created for specific sports teams, leagues, weather reports, horoscopes, stock quotes, and more. Alerts can be set on a regular delivery schedule or for event-triggers such as stock quote and sports score changes. Event-triggered alerts keep users informed about real-time changes to things that they care about. For example, sports alerts can provide instant updates at the end of a period, inning, quarter, half, game or golf round for MLB, NBA, NFL, NHL, PGA, and all major college sports, instant updates when the score changes (excluding NBA) Stock Alerts, instant updates for user-specified stocks or funds at market open and/or close, or instant updates for designated percentage change in price or specified price targets, among others. By giving users the choice to receive event-triggered alerts, users can stay current on the latest changes in their portfolio or with their favorite teams, they can make more informed decisions, save time, and stay in the know continuously about subjects and events that are important to them. Event-triggered alerts are an addition to periodic alerts that can be scheduled for delivery at the time and preference of the user. Periodic alerts include 5-day weather forecasts, daily horoscopes, plus sports and stock alerts that can be set to a time of day instead of an event.

In one implementation, an audio alert can be sent. First, text announcing the alert is sent to the subscriber's cell phone. A connection is made to the live or on-demand audio stream. The user listens to the announcement as a live or on-demand stream. The system provides mobile phone users with access to live and on-demand streaming audio in categories such as music, news, sports, entertainment, religion, and international programming. Users may listen to their favorite music, catch up on latest news, or follow their sports team. The system creates opportunities for content providers and service providers, such as wireless carriers, with a growing content network and an existing and flourishing user base. Text-based or online offerings may be enhanced by streaming live and on-demand audio content to wireless users.

In one implementation, if the user is interested in searching for a store called "Starbucks" in the current vicinity of the user, he/she would type or speak "Starbucks" to the mobile system computer, the system recognizes that the user is looking for Starbucks in his/her vicinity and would automatically determine its current position and append the position into the search term query. Hence, by speaking "Starbucks," the system would determine the location of the cell phone and create a query that searches for Starbucks in San Francisco, for example. In this manner the user can search for services, people, products, and companies that are local to her or him with minimum effort.

In an implementation where the location information is manually entered, the system that interprets the user request intelligently. For example the user can search for services, people, products and companies by telephone area code, by Zip Code, or by airport code. For example, to find a store called "Starbucks" in San Francisco, the user can speak to the cell phone:

Starbucks San Francisco Calif.
Starbucks san fran (does partial match no state)
Starbucks 415 (by area code)
Starbucks 94118 (by Zip Code) [0061]
Starbucks SFO (by airport code)

In the event the system cannot understand the request, the system presents a template with the pre-formatted search string and the user can edit the template and submit the search request in the template format.

Figure 4A:
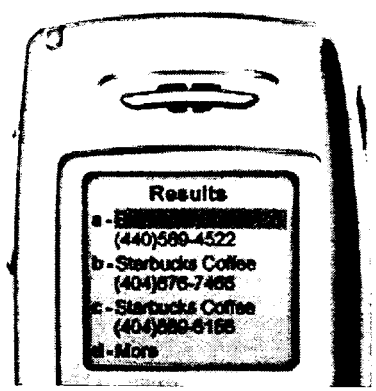
FIG. 4A-4C show representative results of a cordless telephone search.
Figure 4B:
Figure 4C:
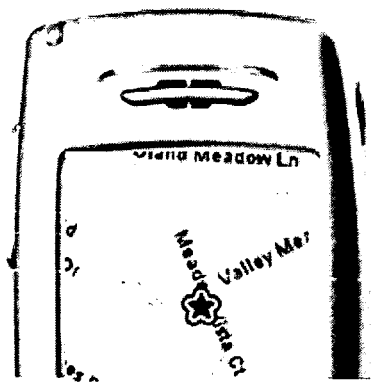

FIGS. 4A-4C show representative results of a voice based search. In this example, the user pronounces "Starbucks" and the system responds with search results in FIG. 4A. For more detail, the user can press a key or reply with a one letter reply of his or her choice. FIG. 4B shows an example expansion when choice 'a' of FIG. 4A is selected. The representative result shown in FIG. 4B includes address and phone number. The result can also be map as shown in FIG. 4C or direction from the user's current position to the target address in other implementations. In other examples, the user can pronounce "Starbucks" along with a zip code, city or name such as "Starbucks 30342," "Starbucks Atlanta," or "Starbucks 404" and the result would be the same as those in FIGS. 4A-4B.

Figure 5:
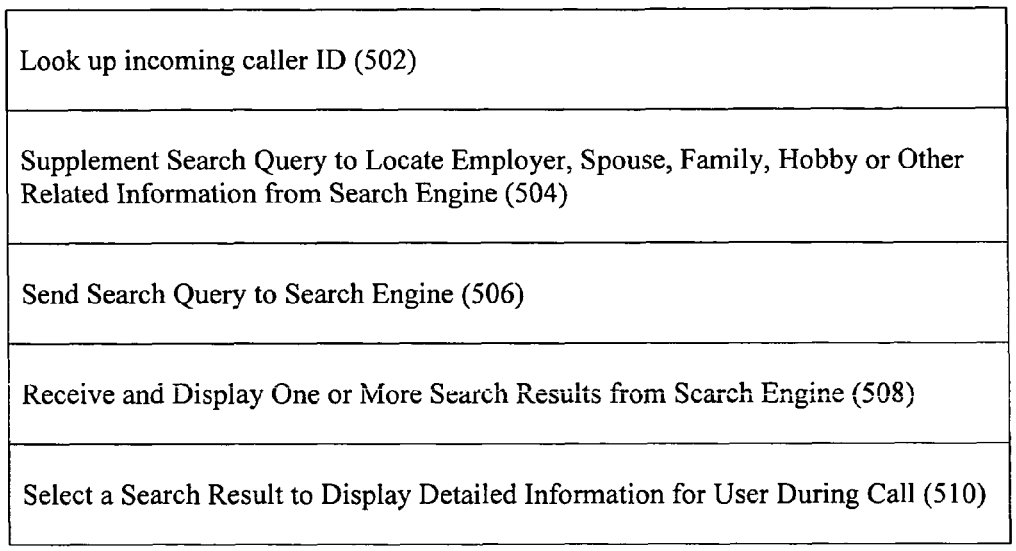
FIG. 5 shows a representative reverse name look up system for directory assistance.

FIG. 5 shows a representative reverse look up system. When the user receives an incoming call, the system looks up incoming caller ID in step 502. This can be done using a telephone directory search in a database or in the cell phone's contact file. Alternatively, the system can search based on the name pronounced by the user's greeting speech. Next, the system supplements a Search Query to locate Employer, Spouse, Family, Hobby, or Other Related Information from a Search Engine in step 504. The system sends a Search Query to the Search Engine in step 506. The system then receives and displays one or more Search Results from the Search Engine in step 508. The system allows the user to scroll and select a Search Result to display more detailed information to the user during the call in step 510.

In addition to SMS or MMS, the system can work with XHTML, Extensible Hypertext Markup Language, also known as WAP 2.0, or it can work with WML, Wireless Markup Language, also known as WAP 1.2. XHTML and WML are formats used to create Web pages that can be displayed in a mobile Web browser. This means that Web pages can be scaled down to fit the phone screen.

In one embodiment, the search engine is a taxonomy search engine (TSE). TSE is a web service approach to federating taxonomic databases such as Google or specialized databases from retailers, for example. The system takes the voice based query (expressed in phonemes, for example), converts the speech symbols into query text and the query is sent to a number of different databases, asking each one whether they contain results for that query. Each database has its own way of returning information about a topic, but the details are hidden from the user. TSE converts the speech symbols into a search query and looks up the query using a number of independent taxonomic databases. One embodiment uses a wrapper-mediator architecture, where there is a wrapper for each external database. This wrapper converts the query into terms understood by the database and then translates the result into a standard format for a mediator which selects appropriate information to be used and formats the information for rendering on a mobile phone.

In another embodiment, the system can handle structured and unstructured databases. The system uses ontologies, each of which is a vocabulary detailing all the significant words for a particular domain, like healthcare or music or video or a consumer item, and the relationship between each word. The system then recognizes these terms in their particular context.

A plurality of ontology systems can be used: one ontology to analyze unstructured information, another to analyze databases or other structured information, and a third to unify the two by data sets. So while a music listener can think of 'U2' as a band, a cell phone can think of 'U2' as a ring-tone, a newspaper might refer to a 'U2' for an incident, a military database might use the terms 'U2' for a spying plane, among others. In one implementation, the system semi-automatically builds and maintains domain specific ontologies. The system performs automatic detection and extraction of events in textual data and integrates the textual temporal information which has been extracted, in a document warehouse. The system provides temporal knowledge discovery of items for trends analysis.

In one aspect, the system semi-automatically builds and maintains domain specific ontologies. The system automatically generates an ontology by examining numerous samples of the type of information typically being searched. The system then analyzes and produces a provisional ontology, which can be adjusted by users' acceptance or rejection of the search results to create a definitive ontology.

In another representative TSE, the system searches taxonomic databases that are related to one another. For instance, if the telephone user enters "U2," the system, based on the ontological and/or taxonomical knowledge of "U2" searches databases relating to music, and locates music vendors of similar content as search results. The search results are provided as a series of links that are displayed on the telephone for the user to select. In one option, the user can select an item and request the vendor to call the user back to complete the sales transaction. In another option, the system automatically fills in an order form and displays to the user for approval prior to submitting the information to the selected vendor. In one implementation, the vendor in turn pays a commission to the system for the sales referral.

In one embodiment, the system includes a multidimensional knowledge map. The knowledge map includes concepts. The concepts are organized into taxonomies. Each taxonomy includes a hierarchical structure. One taxonomy can be a first concept that is ordered with respect to a second concept independent of the hierarchical structure. The content provider system also includes content items. The items can be tagged to the concepts using a value of a structured data attribute associated with the items. In one example, the tagged item is selected from the group consisting of a user query, a user attribute, and a resource. In another example, the item is tagged to at least one of the concepts using at least one keyword included in the item. In another example, the first concept includes a first mapping function including an input and an output. The input of the first mapping function includes a value of a structured data attribute of at least one item. The output of the first mapping function indicates whether to tag the item to the first concept. In a further example, the second concept includes a second mapping function. The second mapping function includes an input and an output. The input of the second mapping function includes a value of a structured data attribute of at least one item. The output of the mapping function indicates whether to tag the at least one item to the second concept, such that the at least one item tagged to the first concept is ordered with respect to the at least one item tagged to the second concept. In one example, the input of the first mapping function includes information obtained from a source external to the system that is used in providing the output of the first mapping function.

In another example, the input of the first mapping function uses information about how the at least one item tags to other concepts in providing the output of the first mapping function. In a further example, the input of the first mapping function uses information about at least one keyword included in the at least one item in providing the output of the first mapping function.

The system can have a multidimensional knowledge map. The system can execute a process that includes organizing concepts into groups representing dimensions of a domain, including ordering a first concept with respect to a second concept in the same group, using at least one structured data parameter, tagging at least one item to at least one of the first and second concepts, and constraining a user's search to only one of the first and second concepts. In another embodiment, one or more items are tagged to at least one of the first and second concepts based at least in part on a first structured data parameter that is modified based on an indication derived from at least one previous user's interaction with the system. In one variation on this embodiment, the tagging is also based on at least one of: a second structured data parameter, language associated with the item, and a second tag associated with the at least one item. In another example, the tagging is also based on at least one of whether the at least one previous user's interaction with the system was deemed successful and context information obtained from a dialog interaction with the at least one previous user. In one embodiment, a gateway provides the search service to POTS/PSTN telephone callers with minimum modification of the existing system.

In one embodiment, an inquiry can be entered by a telephone user. The telephone user can type the inquiry on the telephone keypad or speak the inquiry to the phone. In one embodiment, the spoken inquiry is captured by the server and speech recognition software at the server can convert the spoken inquiry into text that is sent back to the display of the phone for confirmation. In another embodiment, the spoken inquiry can be converted into phonetic equivalents and transmitted as a message such as SMS message or email or WAP message to the server. As noted, the inquiry can be a natural language query, a boolean logic query specifying one or more search terms, or any combination thereof. The server then processes the received inquiry. For example, the inquiry can be parsed to identify keywords, search terms, and boolean operators. If the inquiry is a natural language inquiry, the language can be grammatically parsed to identify likely search terms and discard words which are not relevant to the subject or domain of the inquiry.

Next, the server can determine whether a relevant taxonomy model exists. In particular, using the search terms, the server can examine previously determined taxonomy models to determine whether the domains, types, and/or sub-types of an existing taxonomy model include any common information such as search terms. This determination can be performed with reference to the dictionary and thesaurus databases. That is, the search for an existing taxonomy model can be expanded to include terms specified by the dictionary and/or thesaurus databases which are synonymous and/or related to terms of the inquiry. Accordingly, although an inquiry may not include terminology that is identical to an existing taxonomy model, the server can identify related models by cross referencing the taxonomy model terminology with the inquiry terminology using the dictionary and thesaurus databases. As the dictionary and thesaurus databases can include both predetermined information as well as user configured information, the user can specify relationships between terms and domains such that the server can identify relationships among inquiries and existing taxonomy models despite the existence of only an indirect relationship between the inquiry and taxonomy model.

If one or more existing taxonomy models are found to have an association with the received inquiry, the identified taxonomy models can be used as a seed or basis for generating a new taxonomy model. In particular, attributes from the identified taxonomy models can be used as a baseline model. For example, Internet sites, search engines, databases, and/or Web pages used in the existing taxonomy model can be given higher priority than had no related taxonomy model been identified. Similarly, previously identified relationships between domain types, domain subtypes, and text passages of the existing taxonomy model can be re-examined by the server and used in recursive searches to be described herein in greater detail.

If no existing taxonomy model is relevant to the inquiry, a new taxonomy model is initialized. The server can access the dictionary database and the thesaurus database to identify alternative search terms and phrases to those specified in the inquiry. Accordingly, the server can broaden the scope of the inquiry to encompass synonymous, related, and/or relevant terms without requiring the user to specify an unduly large or complex inquiry. As the dictionary and thesaurus databases can include references to designated search engines suited to the subject matter of that entry, the server further can identify those search target engines which will be searched in response to the broadened inquiry. For example, if the user types "U2," the server searches all music related sites for the available albums from "U2" since the search came from a phone and users are unlikely to search for U2 spy-planes on a telephone. The user can be more specific and enter "U2 review" and the system would search Google or Yahoo or MSN search engines for reviews of the band, sort/filter/remove redundancy, and present articles that the user can review on the rather limited screen of the telephone. Thus, the user can do research using the limited I/O of the phone if necessary, but the default is to assume that the user wants assistance to buy or to get to a particular location rather than to do in-depth research on the limited telephone screen and keypad.

The server can generate and send queries based upon the initial user inquiry. The server can access the rules of the query protocol database to determine the query format associated with the target search engines. Accordingly the server can translate the received inquiry into one or more queries to be directed to the target search engines. Thus, each resulting query can conform to the format required by the particular search engine to which the query is to be directed.

Results from the various target search engines can be received by the server. For example, from each of the target search engines, the server can receive a listing of references in response to the queries provided. The received references can be processed and prioritized. For example, the server can merge the various lists of URLs into a single list, remove duplicate URLs, and prioritize the remaining list according to the prioritization hierarchy specified by the search rules. Copies of the references specified by the processed listing of references can be retrieved. The text of the retrieved references can be extracted by removing any formatting tags or other embedded electronic document overhead. For example, any visual formatting of the text, content labeling of the data, or other data annotations can be removed from the retrieved references.

The server can take a course of action given the existence of particular word and/or text associations within a text passage including, but not limited to acronyms, syntactic variants, synonyms, semantic variants, and domain associations. For example, the rules can specify that a search is to be initiated for each identified acronym such that the resulting taxonomy model and report include information about the acronyms. Acronyms can be identified by identifying terms in all capital letters, using grammatical rules, and/or by specifying the terms within the dictionary and/or thesaurus databases.

Each of the aforementioned word and/or text associations identified within relevant text passages can be recursively identified within newly determined search results and recursively submitted to the various search engines to progressively acquire additional information. Taking another example, an original query for "jazz" can reveal that Acid Jazz, Avant Garde & Free Jazz, Bebop, Brazilian Jazz, Cool Jazz, Jazz Fusion, Jazz Jam Bands, Latin Jazz, Modem Postbebop, New Orleans Jazz, Smooth Jazz, Soul-Jazz & Boogaloo, Swing Jazz, Traditional Jazz & Ragtime, and Vocal Jazz are relevant terms. In this example, the system may recursively submit queries for each type of jazz music to progressively acquire further facts. The system may identify the top ten purchased or downloaded musicians in a particular jazz music type and present that as the search sub-result to the user. The system is also aware of URLs of top retailers for a particular band and can add these URLs into the search sequence on a periodic basis such as on a daily or hourly basis.

After having identified the key relationships as well as the domain types and subtypes, a taxonomy model can be generated to summarize information discovered as a result of the inquiry. The taxonomy model can be formulated as a relational graph where nodes representing domain types are linked with child nodes clustered around the domain type. The child nodes represent the domain subtypes. Each of the nodes, whether a domain type or a domain sub-type, can include one or more attributes. Any incidental terms occurring infrequently can be pruned from the taxonomy model. Accordingly, the resulting clusters of domain types and domain sub-types represent the hierarchy between general and more specific concepts.

Off-line, the server can analyze the taxonomy model to identify patterns within the taxonomy model to provide faster and more accurate search results. The rules can specify particular relationships of interest in the taxonomy model. For example, the research rules can indicate that attributes which co-occur within one concept may be relevant to peer concepts, that concepts which share common attributes may form clusters of potential significance, relationships which divide clusters into mutually exclusive subsets are potentially significant, relationships which generate intersections among distinct clusters are potentially significant. The server can formulate additional sub-queries to provide the target search engines. For example, the sub-queries can specify new combinations of search terms such as domain types, domain subtypes, and attributes as determined from the research rules and the relational graph. Representative pattern rules can include "if type X has attribute Y, then search for other types with attributes of Y" and "if type X has attribute Y, then search for X having an attribute Y with alternative values for Y." Continuing with the previous example, execution of the representative pattern rules can generate sub-queries such as "are there other items like U2 band." The results of the sub-queries can be incorporated into the existing taxonomy model.

The determined taxonomy model can be presented to a system administrator for approval. The administrator can add elements to the taxonomy model, delete elements from the taxonomy model, and/or reorder the contents of the taxonomy model. Once the model is accepted by the administrator, edits to the taxonomy model can be incorporated. A report can be generated for review and can include the relational graph of the taxonomy model, a taxonomy outlining the domain of the taxonomy model, text descriptions of key concepts, attributes, and relationships, as well as citations linking derived results to the original source documents. The resulting taxonomy model and research report can be stored for subsequent use.

The search result is accurate and provides relevant information for the needs of a telephone user. The system brings the advantages of the Internet to telephones that are designed to work over the POTS/PSTN network. One such benefit is the ability to access Internet search engines for POTS/PSTN phones. It lends itself to various embodiments, each of which delivers the information in a text data format but in a different interface manner. The use of a gateway connection between the server and the POTS network provides the greatest degree of service expansion in that the text data may be provided in conjunction with a standard audio delivery, or it may be provided as a direct access database in which no voice call is involved. This is a high value added service which is of immediate benefit to both the client and the telephone service provider. In consideration of its high value and in the flexibility of its delivery, the telephone service provider has a variety of options in charging for the service. This may include a flat monthly subscription fee for all subscribers which eliminates the need for transaction billing, reducing both the service cost to the provider as well as the service charge to the customer.

In another aspect, a telephone system for making free VOIP calls includes a handset with a display, a keypad, and a modem communicating with a remote server. The user makes local and long distance calls for free and in addition may have access to value added services that include, but are not limited to, music, food, restaurant, movie, map, telephone directory, news, blogs, weather, stocks, calendar, sports, horoscopes, lottery, messages, or traffic databases. The display of the phone periodically shows information of interest to the user (such as ads), based on a profile that the user makes when registering with the system. The profile is updated to track services and products that the user actually uses.

Other revenue models can be used. In one embodiment, the system acts as a broker or market-maker: the system brings buyers and sellers together and facilitates transactions. Brokers play a frequent role in business-to-business (B2B), business-to-consumer (B2C), or consumer-to-consumer (C2C) markets. Usually a broker charges a fee or commission for each transaction it enables. The formula for fees can vary. Brokerage models include: Buy/Sell Fulfillment—takes customer orders to buy or sell a product or service, including terms like price and delivery; Demand Collection System—where a prospective buyer makes a final (binding) bid for a specified good or service, and the broker arranges fulfillment; Auction Broker—conducts auctions for sellers (individuals or merchants) Broker charges the seller a listing fee and commission scaled with the value of the transaction; Transaction Broker—provides a third-party payment mechanism for buyers and sellers to settle a transaction; Distributor—a catalog operation that connects a large number of product manufacturers with volume and retail buyers and where Broker facilitates business transactions between franchised distributors and their trading partners; Search Agent—a software agent or "robot" used to search-out the price and availability for a good or service specified by the buyer, or to locate hard to find information; Virtual Marketplace—or virtual mall, a hosting service for online merchants that charges setup, monthly listing, and/or transaction fees.

Alternatively, an advertising model can be used where advertisers pay for referrals or clicks from the telephone. A high volume of user traffic makes advertising profitable and permits further diversification of site services. For example, the system can search classifieds—list items for sale or wanted for purchase. In another embodiment, the system provides free access but require users to register and provide demographic data. Registration allows inter-session tracking of user surfing habits and thereby generates data of potential value in targeted advertising campaigns. The system can also support Contextual Advertising/Behavioral Marketing. For example, a telephone extension that automates authentication and form fill-ins, also delivers advertising links or pop-ups as the user surfs the web. Contextual advertisers can sell targeted advertising based on an individual user's surfing activity. The system can support Content-Targeted Advertising that identifies the meaning of a web page and then automatically delivers relevant ads when a user visits that page. The system can display Intromercials—animated full-screen ads placed at the entry of a site before a user reaches the intended content.

In another business model, the system acts as an Infomediary that provides data about consumers and their consumption habits used to target marketing campaigns. Independently collected data about producers and their products are useful to consumers when considering a purchase.

In another embodiment, the system provides Incentive Marketing—customer loyalty program that provides incentives to customers, such as redeemable points or coupons for making purchases from associated retailers. Data collected about users is sold for targeted advertising. The system can also be a Metamediary that facilitates transactions between buyers and sellers by providing comprehensive information and ancillary services, without being involved in the actual exchange of goods or services between the parties.

The system can also be a merchant, wholesalers, and retailers of goods and services. Sales may be made based on list prices or through auction. The system can also be a merchant that deals strictly in digital products and services and, in its purest form, conducts both sales and distribution of contents such as music/video/call tone/ring tone over the web.

The system performs automatic detection and extraction of events in textual data, and integrates the textual temporal information which has been extracted in a document database. The system provides temporal knowledge discovery of items for trends analysis.

The system can use ontology with non-text information as well. Many repositories of digitized or electronic images, graphics, music and videos have been built. However, searching such multimedia files is still difficult. In one embodiment, the system performs speech recognition on the video and converts speech into text for searching. The converted text is stored as meta-tags associated with the music or video, and upon selection in response to a search, the music or video can be displayed for playing or for purchase.

In another embodiment, a system locates a predetermined multimedia file by having users upload a plurality of image, music and video files to a server, each file including multi-media data such as image or video or audio data and metadata describing the content; extracting the multi-media data and metadata from the multimedia files; updating a search engine index with the metadata; and subsequently locating the predetermined multimedia file using the search engine.

Figure 6:
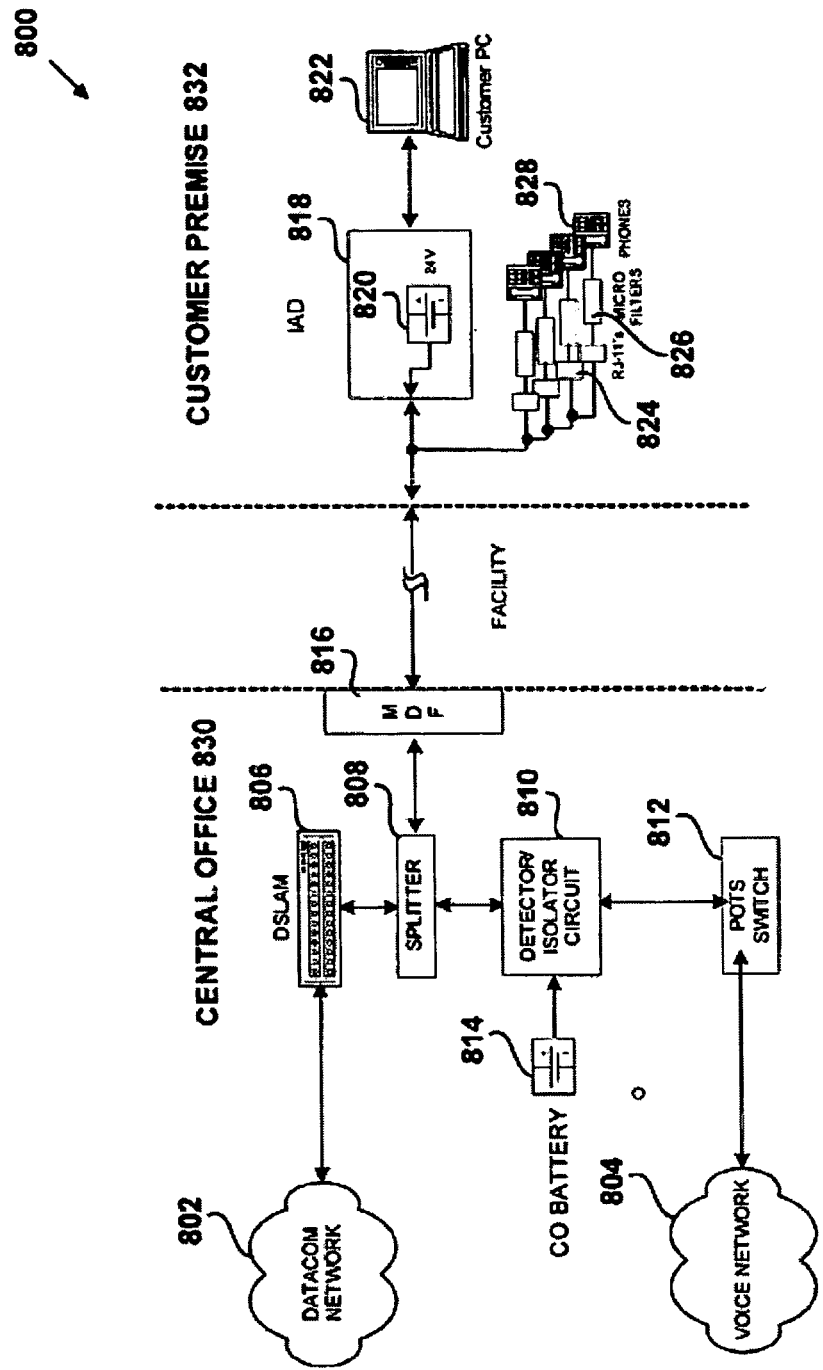
FIG. 6 shows a representative telephone network.

FIG. 6 is a block diagram of a cordless telephone device 400. The cordless telephone device 400 includes a cordless baseband processor 402, a cordless phone radio transmit/receive block 404, a human interface 406, and a power charger 408. The cordless telephone extension 400 may be capable of answering one or more calls by selecting line 1 or line 2 in addition to using a key sequence (e.g., *8) to switch between the calls or an analog line. The cordless telephone extension 400 may be capable of receiving distinctive ring tones and forwarding them to the user interface 406 visually or via melody or distinctive ring pattern. The cordless telephone device 400 can receive data and display the data over IP or other cordless interfaces.

Figure 7:
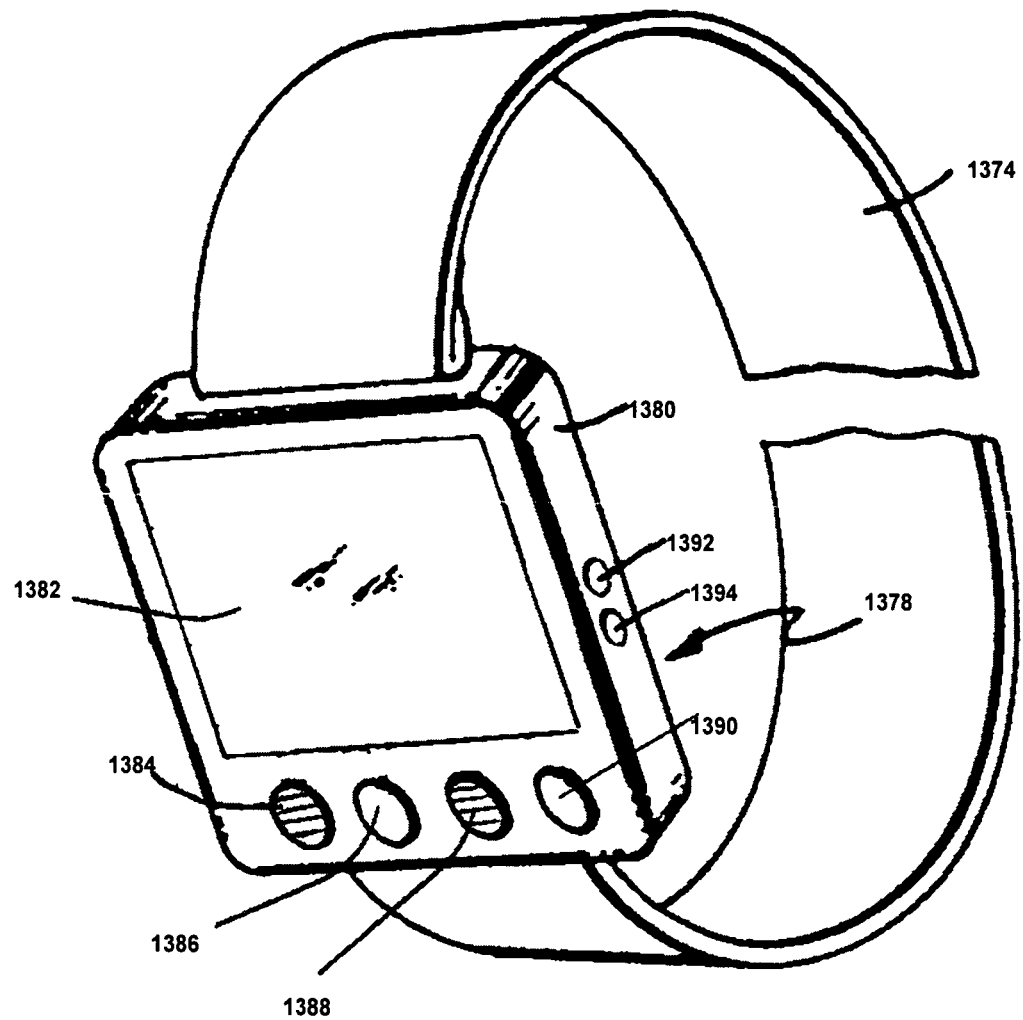
FIG. 7 is a block diagram of a representative wristwatch mesh network appliance or device.

FIG. 6 is a block diagram of a representative telephone network 800 that supports DSL broadband access and VOIP communication. The network or distribution system 800 includes a Central Office 830 and a Customer Premise 832. The Customer Premise 832 includes an IAD 818, which has a battery 820. The in-home wiring is connected to the IAD 818, which provides the interface with a personal computer 822 and/or other devices that communicate using a data network. The in-home wiring is also connected to an RJ-11 jack 824, which is connected to a DSL filter 826, which in turn is connected to a standard POTS telephone 828. As shown in FIG. 7, any number of telephone connections may be found in the home or office.

The Central Office 830 includes a Digital Subscriber Line Access Multiplexer (DSLAM) 806, a splitter 808, an isolator circuit 810, a battery 814, and a POTS switch 812. The Central Office 830 is connected to a data network 802 (including wide area network such as the Internet) via the DSLAM 806 and a voice network 804 via the POTS switch 812. The data network 802 allows the Central Office 830 to communicate with various external databases (such as amazon.com, yahoo.com and other sites for books, music, and video as well as search engines such as google.com, among others). Additionally, the Central Office 830 is connected to the Customer Premises 832 via a Main Distribution Frame (MDF) 816. The MDF 816 is the termination point for external truck cables entering the Central Office 830.

When an IAD 818 is not present in a Customer Premises 832, the isolator circuit 810 allows analog POTS service to pass through normally. However, once an IAD 818 is installed and presents a voltage signal (typically, 24 volts) via the battery 820 onto the tip and ring lines, the isolator circuit 810 detects a voltage differential between the Central Office 830 and the IAD 818. Upon detection of the voltage differential, the isolator circuit 810 activates a relay to disconnect the POTS switch 812 from the isolator circuit 810. While this example uses DC signaling to initiate the isolation function, other communication techniques could also be used, such as using tones. Once the isolator circuit 810 is activated, calls made from any telephone in the home are routed through the IAD 818, converted to VoIP, and sent out to the Internet via DSL transport through the DSLAM 806. The DSLAM 806 is a device for taking connections from many customers and aggregating them into a single, high-capacity connection to the Internet. The DSLAM 806 may provide additional functions, such as routing and dynamic IP address assignment. By including the isolation function to the Central Office 830, installation is simplified. For example, to install the isolator circuit 810 into the customer premises, such as the NID, a service technician needs to travel to the home. The Central Office solution eliminates the need to install equipment at the customer premises. Additional economies may be realized by including the isolator function to the Central Office 830 because one isolator circuit 810 may be used for multiple users.

In another embodiment, the user captures and edits video taken with a camcorder, camera, cordless telephones with cameras, or cellular telephones with cameras. The user performs simple edits to the video segment. The system allows the editing user more creative freedom at each step in the process, such as being able to preview and correct each edit decision on the fly. The video editing process becomes similar to putting together a document or graphics presentation where the user cuts and pastes the segments together, adding effects and titles.

The software can provide Linear Editing where the content can only be edited sequentially similar to older mechanical techniques of cutting films to perform the edit functions. The software can alternatively provide Non-Linear Editing where editing in this environment is essentially a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying). This process requires, at the least, a Camcorder and VCR. The original footage remains intact, but the rearranged footage is transferred to a new tape. Each scene or cut is "assembled" on a blank tape either one-at-a-time or in a sequence. The system can provide two types of Assemble Editing: 1) A Roll—Editing from a single source, with the option of adding an effect, such as titles or transitioning from a frozen image to the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the titles between scenes, previously shot during the editing process.

The system supports Sound Mixing where two or more sound sources can be connected to a sound mixer and then input into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents need to be reduced into chunks of one, five, ten or fifteen minutes, for example, to allow easy viewing while the user is traveling or otherwise does not have full attention on the device for an extended period. In one embodiment, video is micro-chunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The microchunks can be e-mailed, linked to, searched for, downloaded, remixed, and made available on-line.

The user or producer can embed metadata into the video or music. Representative metadata for video or musical content such as CDs includes artist information such as the name and a list of albums available by that artist. Another metadata is album information for the title, creator and Track List. Track metadata describes one audio track and each track can have a title, track number, creator, and track ID. Other representative metadata includes the duration of a track in milliseconds. The metadata can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The metadata can contain release status information with possible values of: StatusOfficial, StatusPromotion, StatusBootleg. Other metadata can be included as well.

The metadata can be entered by the musician, the producer, the record company, or by a music listener or purchaser of the music. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The metadata associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalties on behalf of its users and supports the webcasting of music according to the Digital Millennium Copyright Act, 17 U.S.C. §114. The system obtains a statutory license for the non-interactive streaming of sound recordings from Sound Exchange, the organization designated by the U.S. Copyright Office to collect and distribute statutory royalties to sound recording copyright owners and featured and non-featured artists. The system is also licensed for all U.S. musical composition performance royalties through its licenses with ASCAP, BMI, and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips, and/or videos. The system also identifies music clips or videos in a multimedia data stream and prepares a summary of each music video that includes relevant image, music or video information. The user can search the music using the verbal search system discussed above. Also, for game playing, the system can play the music or the microchunks of video in accordance with a search engine or a game engine instruction to provide better gaming enjoyment.

In one gaming embodiment, one or more accelerometers may be used to detect a scene change during a video game running within the mobile device. For example, the accelerometers can be used in a tilt-display control application where the user tilts the mobile phone to provide an input to the game. In another gaming embodiment, mobile games determine the current position of the mobile device and allow players to establish geofences around a building, city block, or city, to protect their virtual assets. The mobile network such as the WiFi network or the cellular network allows players across the globe to form crews to work with or against one another. In another embodiment, a digital camera enables users to take pictures of themselves and friends, and then map each digital photograph's looks into a character model in the game. Other augmented reality games can be played with position information as well.

FIG. 7 shows a portable embodiment of the present disclosure where the voice recognizer is housed in a wrist-watch. As shown in FIG. 7, the device includes a wrist-watch sized case 1380 supported on a wrist band 1374. The case 1380 may be of a number of variations of shape, but can be conveniently made rectangular, approaching a box-like configuration. The wrist-band 1374 can be an expansion band or a wristwatch strap of plastic, leather, or woven material. The wrist-band 1374 further contains an antenna 1376 for transmitting or receiving radio frequency signals. The wristband 1374 and the antenna 1376 inside the band are mechanically coupled to the top and bottom sides of the wrist-watch housing 1380. Further, the antenna 1376 is electrically coupled to a radio frequency transmitter and receiver for wireless communications with another computer or another user. Although a wrist-band is disclosed, a number of substitutes may be used, including a belt, a ring holder, a brace, or a bracelet, among other suitable substitutes. The housing 1380 contains a processor and associated peripherals to provide the human-machine interface. A display 1382 is located on the front section of the housing 1380. A speaker 1384, a microphone 1388, and a plurality of push-button switches 1386 and 1390 are also located on the front section of housing 1380.

The electronic circuitry housed in the watch case 1380 detects adverse conditions such as falls or seizures. In one implementation, the circuitry can recognize speech, namely utterances of spoken words by the user, and converting the utterances into digital signals. The circuitry for detecting and responding to verbal commands includes a central processing unit (CPU) connected to a ROM/RAM memory via a bus. The CPU can be a low power 16-bit or 32-bit microprocessor and the memory can be a high density, low-power RAM. The CPU is coupled via the bus to processor wake-up logic, one or more accelerometers to detect sudden movement in a patient, an ADC which receives speech input from the microphone. The ADC converts the analog signal produced by the microphone into a sequence of digital values representing the amplitude of the signal produced by the microphone at a sequence of evenly spaced times. The CPU is also coupled to a digital to analog (D/A) converter, which drives the speaker to communicate with the user. Speech signals from the microphone are first amplified, passed through an antialiasing filter before being sampled. The front-end processing includes an amplifier, a bandpass filter to avoid antialiasing, and an analog-to-digital (A/D) converter or a CODEC. To minimize space, the ADC, the DAC and the interface for wireless transceiver and switches may be integrated into one integrated circuit to save space. More representative structures to recognize speech is discussed in U.S. Pat. No. 6,070,140 by the inventor of the instant disclosure, the content of which is hereby incorporated by reference.

In one embodiment, the processor and transceiver conform to the ZigBee protocol. ZigBee was created to address the market need for a cost-effective, standards-based wireless networking solution that supports low data-rates, low-power consumption, security, and reliability. Single chip ZigBee controllers with wireless transceivers built-in include the Chipcon/Ember CC2420 and from FreeScale. In various embodiments, the processor communicates with a Z axis accelerometer and measures the patient's up and down motion and/or an X and Y axis accelerometer measures the patient's forward and side movements. The controllers upload the captured data when the memory is full.

The wristwatch device can also be used for home automation. The user can enjoy flexible management of lighting, heating, and cooling systems from anywhere in the home. The watch automates control of multiple home systems to improve conservation, convenience, and safety. The watch can capture highly detailed electric, water, and gas utility usage data and embed intelligence to optimize consumption of natural resources. The system is convenient in that it can be installed, upgraded and networked without wires. The patient can receive automatic notification upon detection of unusual events in his or her home. For example, if smoke or carbon monoxide detectors detect a problem, the wrist-watch can buzz or vibrate to alert the user and the central hub triggers selected lights to illuminate the safest exit route.

In another embodiment, the watch serves as a mobile telephone when there are sufficient ZigBee radios in a particular neighborhood. In that case, calls are routed through the mesh network to the wristwatch for voice calls.

In another embodiment, the watch serves as a key fob allowing the user to wirelessly unlock doors controlled by the ZigBee wireless receiver. In this embodiment, when the user is within range, the door ZigBee transceiver receives a request to unlock the door, and the ZigBee transceiver on the door transmits an authentication request using a suitable security mechanism. Upon entry, the ZigBee doorlock device sends signals to the lighting, air-conditioning, and entertainment systems, among others. The lights and temperature are automatically set to pre-programmed preferences.

Although ZigBee is mentioned as a representative protocol, other protocols such as Bluetooth and WiFi and WiMAX can be used as well.

While the foregoing addresses the needs of the elderly, the system can assist infants as well. Much attention has been given to ways to reduce a risk of dying from Sudden Infant Death Syndrome (SIDS), an affliction which threatens infants in their sleep for heretofore unknown reasons. Many different explanations for this syndrome and ways to prevent the syndrome are found in the literature. It is thought that infants which sleep on their backs may be at risk of death because of the danger of formula regurgitation and liquid aspiration into the lungs. It has been thought that infants of six (6) months or less do not have the motor skills or body muscular development to regulate movements responsive to correcting breathing problems that may occur during sleep.

In a representative system to detect and minimize SIDS problem in an infant patient, a diaper pad is used to hold an array of integrated sensors and the pad can be placed over a diaper, clothing, or blanket. The integrated sensors can provide data for measuring position, temperature, sound, vibration, movement, and optionally other physical properties through additional sensors. Each pad can have sensors that provide one or more of the above data. The sensors can be added or removed as necessary depending on the type of data being collected.

The sensor should be water proof and disposable. The sensor can be switched on/off locally or remotely. The sensor can be removalable or clip on easily. The sensor can store or beam out information for analysis purposes, e.g., store body temperature every 5 seconds. The sensor can be turned on for other purposes, e.g., diaper wet, and it will beep and allow a baby care provider to take care of the business in time. The array of sensors can be self selective, e.g., when one sensor can detect strong heart beat, it will turn off others to do so.

The sensor can be used for a drug delivery system, e.g., when a patient has abdomen pain, a soothing drug can be applied; based on the level of pain the sensor detects, different doses of drugs will be applied.

The array of sensors may allow the selection and analysis of zones of sensors in the areas of interest, such as the abdomen area. Each sensor array has a low spatial resolution: approximately 10 cm between each sensor. In addition to lower cost due to the low number of sensors, it is also possible to modify the data collection rate from certain sensors that are providing high-quality data. Other sensors may include those worn on the body, such as in watch bands, finger rings, or adhesive sensors, but telemetry, not wires, would be used to communicate with the controller.

The sensor can be a passive device such as a reader, which, mounted near the crib, can active it from time to time. In any emergency situation, the sensor automatically signals a different state which the reader can detect.

The sensor can be active and powered by body motion or body heat. The sensor can detect a low battery situation and warn the user to provide a replacement battery. In one embodiment, a plurality of sensors attached to the infant collects the vital parameters. For example, the sensors can be attached to the infant's clothing (shirt or pant), diaper, undergarment or bed sheet, bed linen, or bed spread.

The patient may wear one or more sensors, for example devices for sensing ECG, EKG, blood pressure, sugar level, among others. In one embodiment, the sensors are mounted on the patient's wrist (such as a wristwatch sensor) and other convenient anatomical locations. Representative sensors include standard medical diagnostics for detecting the body's electrical signals emanating from muscles (EMG and EOG) and brain (EEG) and cardiovascular system (ECG). Leg sensors can include piezoelectric accelerometers designed to give a qualitative assessment of limb movement. Additionally, thoracic and abdominal bands used to measure expansion and contraction of the thorax and abdomen respectively. A small sensor can be mounted on the subject's finger in order to detect blood-oxygen levels and pulse rate. Additionally, a microphone can be attached to the throat and used in sleep diagnostic recordings for detecting breathing and other noise. One or more position sensors can be used for detecting orientation of body (lying on left side, right side or back) during sleep diagnostic recordings. Each of sensors can individually transmit data to the server using wired or wireless transmission. Alternatively, all sensors can be fed through a common bus into a single transceiver for wired or wireless transmission. The transmission can be done using a magnetic medium such as a floppy disk or a flash memory card, or can be done using an infrared or radio network link, among others.

In one embodiment, the sensors for monitoring vital signs are enclosed in a wrist-watch sized case supported on a wrist band. The sensors can be attached to the back of the case. For example, in one embodiment, Cygnus' AutoSensor (Redwood City, Calif.) is used as a glucose sensor. A low electric current pulls glucose through the skin. Glucose is accumulated in two gel collection discs in the AutoSensor. The AutoSensor measures the glucose and a reading is displayed by the watch.

In another embodiment, EKG/ECG contact points are positioned on the back of the wrist-watch case. In yet another embodiment that provides continuous, beat-to-beat wrist arterial pulse rate measurements, a pressure sensor is housed in a casing with a 'free-floating' plunger as the sensor applanates the radial artery. A strap provides a constant force for effective applanation and ensuring the position of the sensor housing to remain constant after any wrist movements. The change in the electrical signals due to change in pressure is detected as a result of the piezoresistive nature of the sensor are then analyzed to arrive at various arterial pressure, systolic pressure, diastolic pressure, time indices, and other blood pressure parameters.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory, or other memory technology, CD-ROMs, digital versatile disks (DVD) or other optical storage, magnetic cassettes, magnetic tapes, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

All references including patent applications and publications cited herein are incorporated herein by reference in their entirety and for all purposes to the same extent as if each individual publication, or patent, or patent application was specifically and individually indicated to be incorporated by reference in its entirety for all purposes. Many modifications and variations of this disclosure can be made without departing from its spirit and scope, as will be apparent to those skilled in the art. The specific embodiments described herein are offered by way of example only. The above specification, examples and data provide a complete description of the manufacture and use of the composition of the disclosure. Many embodiments of the disclosure can be made without departing from the spirit and scope of the claimed subject matter.

What is claimed is:

1. A system, comprising:
    a mesh network cordless telephone base station positionable inside a building and configured to communicate with a mesh network, wherein the mesh network telephone base station includes a telephone jack wired to a plain old telephone service (POTS) or a public switched telephone network (PSTN) land-line;
    a cordless telephone positionable inside the building and configured to communicate with the cordless telephone base station via the mesh network, wherein the mesh network is configured to transfer data between the cordless telephone and the cordless telephone base station over intermediate nodes; and
    a server coupled to the base station, wherein the server is configured to receive a search query from the cordless telephone, wherein the server is configured to search one or more databases based on the search query and return a search result on a display, wherein the server is configured to select a third party associated with one of the search results to call back the cordless telephone, and wherein the server is configured to transmit the cordless telephone's caller identification (Caller ID) to the third party to call back the cordless telephone.

2. The system of claim 1, wherein the mesh network comprises an 802.15 network.

3. The system of claim 1, wherein the cordless telephone is configured to record a message from a caller, wherein the cordless telephone is configured to answer two calls by selecting a first line or a second line, and wherein the cordless telephone is configured to receive distinctive ring tones and rings with a melody or distinctive ring pattern.

4. The system of claim 1, wherein the cordless telephone comprises a Voice Over Internet Protocol (VOIP) telephone.

5. The system of claim 1, wherein the third party pays a fee for each Caller ID transmitted to the third party.

6. The system of claim 1, wherein the one or more databases comprise one or more of music, food, restaurant, movie, map, telephone directory, news, blogs, weather, stocks, calendar, sports, horoscopes, lottery, messages, traffic, and direction.

7. The system of claim 1, comprising a mesh network appliance configured to provide one of home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, and remote diagnostic.

8. The system of claim 1, wherein the cordless telephone is coupled to a cellular telephone configured to answer calls directed at the cellular telephone.

9. The system of claim 8, wherein the cordless telephone is configured to synchronize calendar, contact, emails, blogs, or instant messaging with the cellular telephone.

10. The system of claim 1, wherein the cordless telephone is configured to synchronize calendar, contact, emails, blogs, or instant messaging with a personal computer.

11. The system of claim 1, comprising a patient monitoring appliance coupled to the POTS or PSTN through the mesh network.

12. The system of claim 11, wherein the patient monitoring appliance is configured to monitor drug usage and patient falls.

13. The system of claim 11, wherein the patient monitoring appliance is configured to monitor patient movement.

14. The system of claim 1, comprising an indoor positioning system coupled to one or more mesh network appliances configured to provide location information derived using nodes of the mesh network.

15. The system of claim 1, comprising a call center coupled to the cordless telephone configured to provide a human response if a patient falls and is unable to get up, wherein a patient monitoring appliance monitors patient falls.

16. The system of claim 1, comprising a web server coupled to the mesh network and to the POTS and configured to provide information to an authorized remote user.

17. A system, comprising:
    a cordless telephone including a ZigBee transceiver configured to communicate digitized voice and data via a ZigBee wireless link, wherein the cordless telephone is positionable inside a building;
    a mesh network cordless telephone base station wirelessly coupled to the cordless telephone via the ZigBee wireless link, wherein the mesh network cordless telephone base station is positionable inside the building, is configured to communicate via a mesh network, and includes a telephone jack coupled to a plain old telephone service (POTS) or a public switched telephone network (PSTN) land-line; and
    a server coupled to the base station, wherein the server is configured to receive a search query from the cordless telephone, wherein the server is further configured to search one or more databases based on the search query and return a search result on a display, wherein the server is configured to select a third party associated with one of the search results to call back the cordless telephone, and wherein the server is configured to transmit the cordless telephone's caller identification (Caller ID) to the third party to call back the cordless telephone.

18. The system of claim 17, wherein the server is coupled to the POTS or PSTN, wherein the server is configured to provide information to one of directory assistance, yellow page directory, white page directory, search engine, music, food, restaurant, movie, map, telephone directory, news, blogs, weather, stocks, calendar, sports, horoscopes, lottery, messages, traffic, and direction wherein the third party pays a fee for each Caller ID transmitted to the third party.

19. The system of claim 17, wherein the cordless telephone is configured to synchronize calendar, contact, emails, blogs, or instant messaging with a personal computer or a cellular telephone.

20. The system of claim 17, comprising a call center coupled to the cordless telephone and configured to provide a human response if a patient falls and is unable to get up, wherein the cordless phone is configured to monitor patient falls.

21. A method, comprising:
receiving a search query on a server from a cordless telephone positionable inside a building, wherein the server is coupled to a mesh network cordless telephone base station positionable inside the building and configured to communicate with the cordless telephone via one or more mesh network wireless communication links, and wherein the cordless telephone base station includes a telephone jack wired to a plain old telephone service (POTS) or a public switched telephone network (PSTN) land-line;
searching one or more databases based on the search query;
returning a search result on a display;
selecting by the server a third party associated with one of the search results to call back the cordless telephone; and
transmitting by the server the cordless telephone's caller identification (Caller ID) to the third party to call back the cordless telephone.

22. The method of claim 21, wherein the third party pays a fee for each Caller ID transmitted to the third party.

23. The method of claim 21, wherein the one or more databases comprise one or more of music, food, restaurant, movie, map, telephone directory, news, blogs, weather, stocks, calendar, sports, horoscopes, lottery, messages, traffic, and direction.

24. The method of claim 21, comprising providing one of home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, and remote diagnostic, through a mesh network appliance.

25. The method of claim 21, wherein the one or more mesh network wireless communication links include one or more ZigBee wireless communication links.

26. The method of claim 21, comprising synchronizing one or more of a calendar, contacts, emails, blogs, and instant messaging of the cordless telephone with a personal computer or a cellular telephone.

27. The method of claim 21, comprising providing a human response from a call center coupled to the cordless telephone if a patient falls and is unable to get up, wherein the cordless telephone is configured to monitor patient falls.

28. A non-transitory, computer-readable storage medium having instructions stored thereon that, in response to execution by at least one computing device, cause the at least one computing device to:
receive a search query from a cordless telephone positionable inside a building, wherein the cordless telephone is configured to communicate with a mesh network cordless telephone base station via one or more mesh network wireless communication links, and wherein the mesh network cordless telephone base station is positionable inside the building and includes a telephone jack wired to a plain old telephone service (POTS) or a public switched telephone network (PSTN) land-line;
search one or more databases based on the search query;
return a search result on a display;
select a third party associated with one of the search results to call back the cordless telephone; and
transmit the cordless telephone's caller identification (Caller ID) to the third party to call back the cordless telephone.

* * * * *